United States Patent
Haller et al.

(10) Patent No.: US 10,965,443 B2
(45) Date of Patent: Mar. 30, 2021

(54) AMPLITUDE CACHING IN RECEIVE FROM MANY COMMUNICATIONS NETWORKS

(71) Applicant: Microsoft Technology Licensing, LLC, Redmond, WA (US)

(72) Inventors: Istvan Haller, Cambridge (GB); Krzysztof Jozwik, Cambridge (GB); Hitesh Ballani, Cambridge (GB); Paolo Costa, London (GB); Benn Charles Thomsen, London (GB); Foteini Karinou, Cambridge (GB); Daniel Jonathan Finchley Cletheroe, Cambridge (GB); Kai Shi, Cambridge (GB); Sophie Gloria Lange, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/445,198

(22) Filed: Jun. 18, 2019

(65) Prior Publication Data

US 2020/0336290 A1 Oct. 22, 2020

(30) Foreign Application Priority Data

Apr. 17, 2019 (GB) .................................... 1905471

(51) Int. Cl.
*H04L 7/06* (2006.01)
*H04L 12/46* (2006.01)
*H04L 25/02* (2006.01)

(52) U.S. Cl.
CPC ................ *H04L 7/06* (2013.01); *H04L 12/46* (2013.01); *H04L 25/0202* (2013.01)

(58) Field of Classification Search
CPC ........ H04L 7/06; H04L 12/46; H04L 25/0202
See application file for complete search history.

(56) References Cited

U.S. PATENT DOCUMENTS

| | | | | |
|---|---|---|---|---|
| 5,008,879 A | * | 4/1991 | Fischer | ............. H04L 12/40032 370/400 |
| 5,410,363 A | | 4/1995 | Capen et al. | |

(Continued)

FOREIGN PATENT DOCUMENTS

| | | |
|---|---|---|
| EP | 369690 A2 | 5/1990 |
| EP | 2779484 A1 | 9/2014 |
| JP | 2011146966 A | 7/2011 |

OTHER PUBLICATIONS

"Final Office Action Issued in U.S. Appl. No. 15/857,321", dated Jun. 21, 2019,13 Pages.

(Continued)

*Primary Examiner* — Duc C Ho

(57) ABSTRACT

In various examples there is a communications network comprising a plurality of nodes connected via an interconnection medium to form a receive-from-many communications network. The network has a synchronisation mechanism which synchronizes a signal frequency of the nodes. The network has at least one store holding signal amplitude data of signals previously sent between specified pairs of nodes of the communications network. An amplitude controller uses the stored data to adjust amplitudes of signals communicated between at least one of the pairs of nodes of the communications network.

20 Claims, 9 Drawing Sheets

(56) References Cited

U.S. PATENT DOCUMENTS

| | | | |
|---|---|---|---|
| 5,555,277 A * | 9/1996 | Lawrence | H03G 3/001 375/285 |
| 6,052,389 A | 4/2000 | Kim | |
| 6,434,640 B1 | 8/2002 | Keller | |
| 6,559,994 B1 | 5/2003 | Chen et al. | |
| 6,646,953 B1 | 11/2003 | Stark | |
| 6,745,013 B1 | 6/2004 | Porter et al. | |
| 7,430,192 B1 | 9/2008 | Snodgrass et al. | |
| 7,526,664 B2 | 4/2009 | Best et al. | |
| 7,663,762 B2 | 2/2010 | Mahgerefteh et al. | |
| 7,889,815 B2 | 2/2011 | Miremadi et al. | |
| 8,249,455 B2 | 8/2012 | Kazawa et al. | |
| 8,831,145 B2 | 9/2014 | Shelburne | |
| 9,209,960 B1 | 12/2015 | Leung et al. | |
| 9,467,278 B2 | 10/2016 | Ma | |
| 9,559,878 B2 | 1/2017 | Giaconi et al. | |
| 2004/0247246 A1 | 12/2004 | Lee et al. | |
| 2006/0076993 A1 | 4/2006 | Teo et al. | |
| 2011/0249718 A1 | 10/2011 | Zerbe | |
| 2015/0089164 A1 | 3/2015 | Ware et al. | |
| 2015/0303950 A1 * | 10/2015 | Shattil | H04B 1/0003 370/328 |

OTHER PUBLICATIONS

"Non Final Office Action Issued in U.S. Appl. No. 15/857,321", dated Mar. 7, 2019,12 Pages.

Choi, et al."BER-adaptive flexible-format transmitter for elastic optical networks", In Journal of Optics Express, vol. 20, Issue 17, Aug. 13, 2012, pp. 18652-18658.

Grzybowski,, et al."The OSMOSIS Optical Packet Switch for Supercomputers: Enabling Technologies and Measured Performance", In Proceedings of Photonics in Switching, Aug. 19, 2007, pp. 21-22.

Hsieh,, et al."Architectures for multi-gigabit wire-linked clock and data recovery", In Journal of IEEE Circuits and Systems Magazine, vol. 8, Issue 4, Dec. 9, 2008, pp. 45-57.

Mehravari, et al."Frame synchronization in a photonic network of time multiplexed space switches via a feedback scheme", In Proceedings of IEEE Transactions on Communications, Jun. 1990,pp. 830-837.

"International Search Report and Written Opinion Issued in PCT Application No. PCT/US2018/055768", dated Jan. 21, 2019,14 Pages.

Rylyakov, et al."A 25 Gb/s Burst-Mode Receiver for Low Latency Photonic Switch Networks", In IEEE Journal of Solid-State Circuits, vol. 50, Issue 12, Dec. 2015, pp. 3120-3132.

"International Search Report and Written Opinion Issued in PCT Application No. PCT/US20/023034", dated Jun. 17, 2020, 12 Pages.

* cited by examiner

US 10,965,443 B2

AMPLITUDE CACHING IN RECEIVE FROM MANY COMMUNICATIONS NETWORKS

CROSS-REFERENCE TO RELATED APPLICATION(S)

This non-provisional utility application claims priority to UK patent application number 1905471.7 entitled "AMPLITUDE CACHING IN RECEIVE-FROM-MANY COMMUNICATIONS NETWORKS" and filed on Apr. 17, 2019, which is incorporated herein in its entirety by reference

BACKGROUND

A receive-from-many communications network is formed from a plurality of transmitting nodes connected to at least one receiving node via an interconnection medium. By using one or more switches or other mechanisms in the interconnection medium, an individual transmitting node is able to send to different ones of the individual receiving nodes at different times. In this way, an individual receiver receives signals from different transmitting nodes at different times.

When a receiving node receives different signals at different times it typically experiences changes in amplitude of the received signal. However, signal receivers are often sensitive to changes in amplitude of the received signal and it can be very difficult to cope with such amplitude changes, especially where the amplitude changes are at a high frequency or contain high frequency content. As a result it is difficult for the receiving node to operate accurately and robustly to receive incoming signals in analog form.

The embodiments described below are not limited to implementations which solve any or all of the disadvantages of known receive-from-many communications networks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a communications network comprising a plurality of nodes connected via an interconnection medium to form a receive-from-many communications network. The network has a synchronisation mechanism which synchronizes a signal frequency of the nodes. The network has at least one store holding signal amplitude data of signals previously sent between specified pairs of nodes of the communications network. An amplitude controller uses the stored data to adjust amplitudes of signals communicated between at least one of the pairs of nodes of the communications network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

A receive-from-many communications network is formed from a plurality of transmitting nodes connected to at least one receiving node via an interconnection medium. The interconnection medium is any plurality of communications links connecting the nodes directly or via intermediate nodes such as routers, switches, proxy nodes or other intermediate nodes. In a receive-from-many communications network an individual node may act as both a sender and a receiver although it is not essential to do so.

In a receive-from-many communications network it is difficult for receiver nodes to cope with changes in amplitude of incoming signals. This is particularly the case where amplitude changes are at a very high frequency or contain high frequency content due to abrupt sharp edges.

Where an automatic gain control feedback loop is used to adjust the gain of the receiver so the signal amplitude is constant before a demodulator processes the signal, it is difficult to implement the automatic gain control feedback loop because the loop bandwidth of the control system is very large. It becomes harder to build a stable feedback loop at larger loop bandwidths and instability leads to non-working results.

Where a feed-forward control system is used to adjust the gain of the receiver so the signal amplitude is constant before a demodulator processes the signal, it is difficult to implement the feed-forward control system because of the high bandwidth and linearity requirements.

Figure 1:
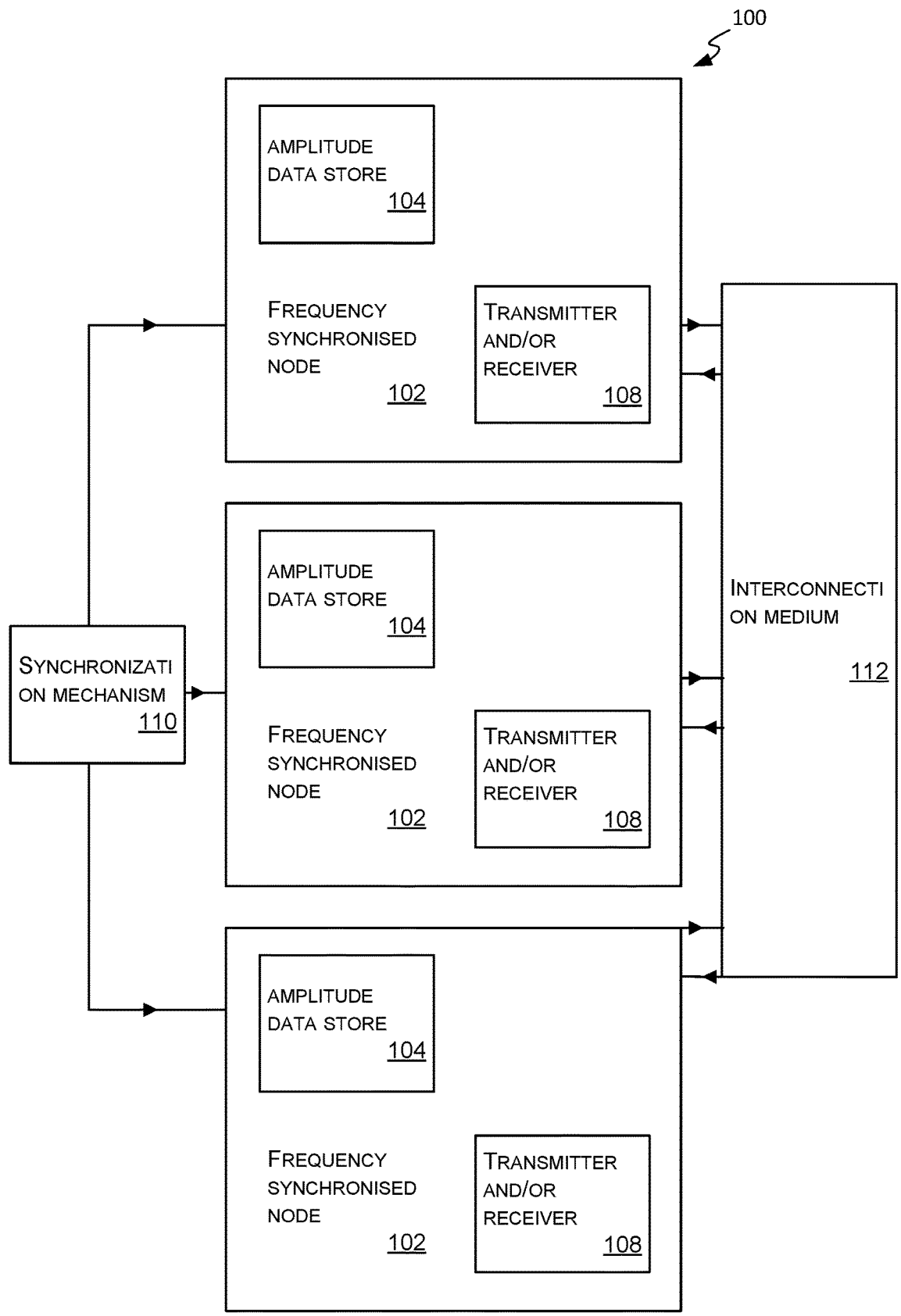
FIG. 1 is a schematic diagram of a communications network implementing the present technology.

FIG. 1 is a schematic diagram of a receive-from-many communications network 100 implementing the present technology. The communications network 100 comprises a plurality of nodes 102 connected to one another by an interconnection medium 112 such as one or more optical and/or electrical circuit switches. In some examples, there are many hundreds or thousands of nodes but only three are shown in FIG. 1 for clarity. A circuit switch is a mechanism for connecting a specified pair of nodes of the network so that the specified nodes of the pair are changeable. In the case of an optical network the circuit switch is a high radix optical switch in some examples of the present technology. A high radix optical switch comprises thousands of ports with high per-port bandwidth (over 20 giga bits per second) and low switching latency (less than 40 nano seconds). An electric circuit switch is an electrical means for connecting a specified pair of nodes of the network so that the specified nodes of the pair is changeable.

The communications network 100 comprises a synchronization mechanism 110 which is implemented in a variety of different possible ways. In an example the synchronization mechanism is implemented based on a mixed signal phase locked loop that uses information from the data links between the communications network nodes. In some cases the synchronization mechanism comprises a physical reference clock connected to each of the nodes 102 in a point to point fashion or connected to the nodes 102 in a hierarchical fashion. In the case of hierarchical connection the physical reference clock is directly connected to at least one of the nodes 102 and information from the reference clock is sent from the node(s) directly connected to the physical reference clock to others of the nodes. In some cases the synchronization mechanism comprises use of Synchronous Ethernet (trade mark) which is an International Telecommunication Union standard used to achieve frequency synchronization. The examples of ways of implementing the synchronization mechanism are not intended to limit the scope of the technology as other synchronization mechanisms are used in some examples.

Each node 102 comprises a transmitter and/or receiver 108 in order to transmit and/or receive signals with others of the nodes 102 over the interconnection medium 112. Where a node 102 acts to send a signal it is referred to as a transmitting node herein. Where a node 102 acts to receive a signal it is referred to as a receiving node herein for clarity. However, a single node is able to act as a transmitting node and as a receiving node. Because the nodes 102 are frequency synchronized the signals sent by the nodes 102 are at the same frequency.

Consider an individual receiving node of the communications network 100. It receives a signal from one of the transmitting nodes in a first time slot and in the next time slot it receives a signal from another one of the transmitting nodes. As a result the signals it receives in the different time slots have different amplitudes because they have been received over different paths through the interconnection medium 112. The amplitudes are different because of differences in path length, path characteristics, temperature and so on. The changes in amplitude of received signal at the receiving node are at high frequency where the time slotting is high frequency.

A key challenge for any time-slotted network relying on fast circuit switches, for example, an optically-switched network, is that each node is to receive traffic from different senders across the timeslots. When the timeslots are in the order of tens of nanoseconds, the guard period between slots is in the order of sub-nanosecond, so that the channel capacity is not significantly reduced. This type of fast switching enables latency-sensitive workloads to be supported on the receive-from-many communications network.

Thus the present technology is concerned with how to deal with the problem of changes in amplitude of received signal at a receiving node of the receive-from-many communications network. The technology uses stored amplitude data to adjust the amplitude of signals received at the receiving node in order to achieve generally smooth or generally constant amplitude at the receiver over a plurality of time slots. The stored amplitude data is historical amplitude data observed at receiver nodes for the different channels, where a channel is a path from a particular transmitting node to a particular receiving node. The historical amplitude data gives a good indication of amplitudes of future signals since the historical amplitude data is dynamically updated as the communications network operates.

The stored amplitude data 104 is accessible to the nodes 102 and is stored locally at one or more of the nodes 102 or stored at another location. The stored amplitude data is empirically derived by measuring amplitude received at the receiving nodes in an amplitude estimation process. The estimated amplitude is used to update the stored amplitude data. The stored amplitude data comprises amplitude offsets to be applied to a signal before transmission, and/or immediately before demodulation of the signal at a receiver.

In an example, every transmitting node caches a table comprising amplitude values corresponding to every receiving node connected to the network. The cached amplitude value is to be used by the transmitting node to adjust the signal amplitude before sending data to the corresponding destination. By resetting the amplitude at each transmitting node at each timeslot (i.e., every time a transmission occurs between a pair of nodes), the process ensures that the receiver signal amplitude remains generally constant.

In another example, every receiving node caches a table comprising amplitude values corresponding to every transmitting node connected to the network. The cached amplitude value is used by the receiving node when receiving data from the corresponding transmitting node. By adjusting the amplitude at each receiving node at each timeslot (i.e., every time a transmission occurs between a pair of nodes), the process ensures that each receiving node has an approximately constant amplitude signal to input to its demodulator.

In another example, hybrid amplitude caching is used. This involves each transmitting node caching a table of amplitude value for all receiving nodes and every receiving node caching a table of amplitude values for all transmitting nodes. In effect, the hybrid technique allows the amplitude adjustment needed between a pair of nodes to be divided across the transmitting node and the receiving node.

Alternative approaches which seek to use feedforward or feedback control loops give expensive and invasive hardware mechanisms and in some cases reduce stability of the transmitting and receiving nodes.

Use of stored amplitude data enables the communications network as a whole, or individual nodes of the communications network, to operate in an unconventional manner to mitigate against fluctuations in amplitude of signals received at receiving nodes of the communications network.

Use of stored amplitude data improves the functioning of the underlying communications network node by enabling fluctuations in amplitude of signals received at the communications network node to be reduced.

Figure 1A:
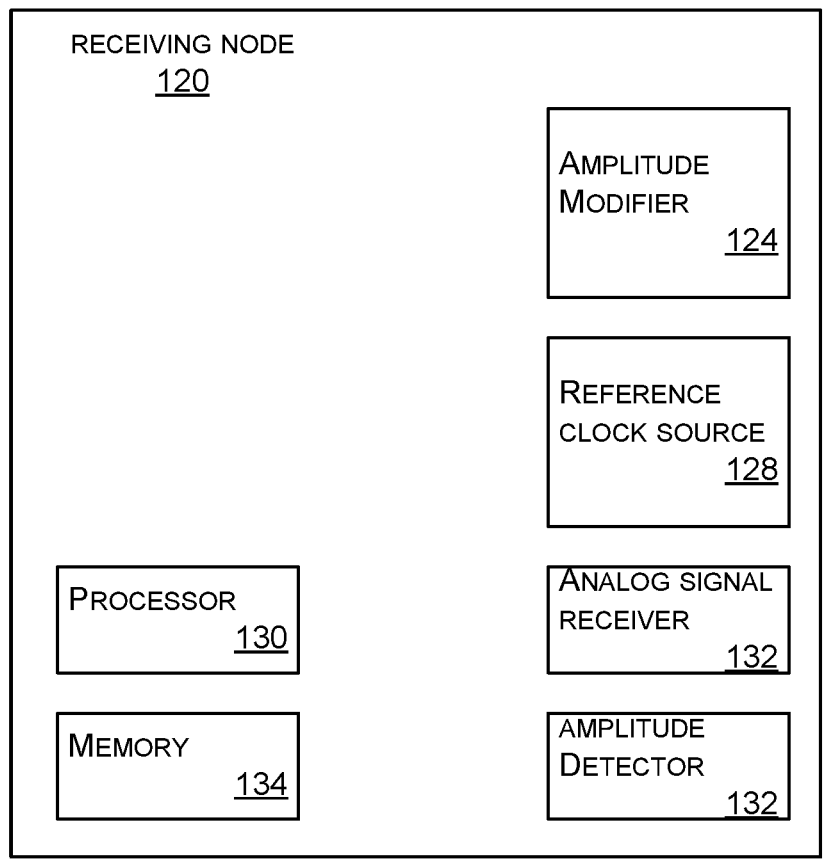
FIG. 1a is a schematic diagram of a receiver of a node of the communications network of FIG. 1.

FIG. 1A shows one of the nodes 102 of FIG. 1 where the node is a receiving node 120. It comprises an amplitude modifier 124 which is able to change an amplitude of an incoming signal before it is passed to the analog signal receiver 132 for demodulation. In one example, which is not intended to limit the scope of the technology, the amplitude modifier 124 is an attenuator. The receiving node has a reference clock source 128 from the synchronization mechanism 110. It also comprises a processor 130, a memory 134 and an analog signal receiver 132. The receiving node has an amplitude detector 136 which is configured to estimate a amplitude of the incoming signal.

Figure 1B:
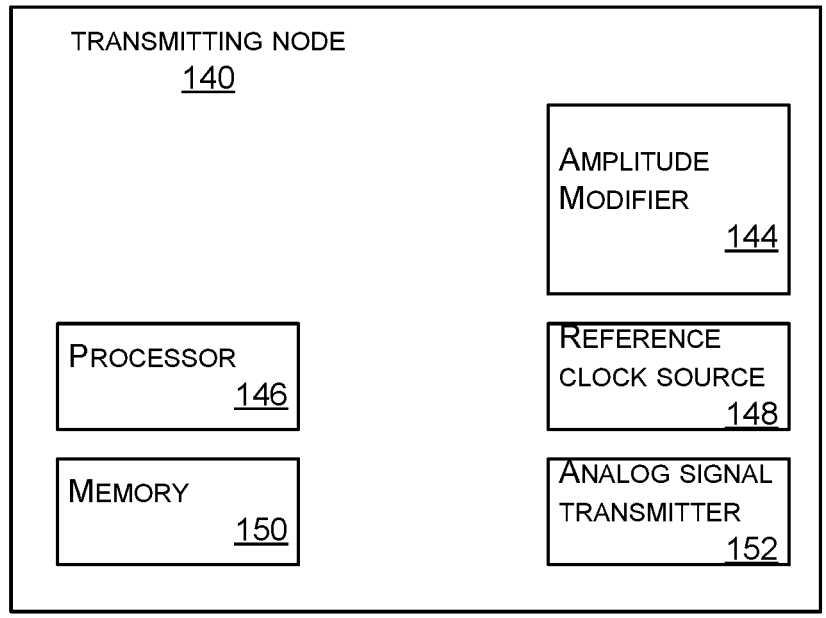
FIG. 1b is a schematic diagram of a transmitter of a node of the communications network of FIG. 1.

FIG. 1B shows one of the nodes 102 of FIG. 1 where the node is a transmitting node 140. It is the same as the receiving node 120 except that the analog signal receiver 132 is replaced by an analog signal transmitter 152. The amplitude modifier 144 is an attenuator or other device to adjust the amplitude of an analog signal transmitted by the analog signal transmitter 152. The transmitting node 140 has a reference clock source 148, a memory 150 and a processor 146.

The interconnection medium switches between different ones of the nodes in a fast, time slotted manner. That is, at each time slot the interconnection medium switches at least one of the receiving nodes off its current transmitting node and onto a different transmitting node. The receiving node thus receives signals at different amplitudes.

The communications network comprises an arbitration mechanism in some examples. The arbitration mechanism comprises one or more rules, thresholds or criteria used to enable resolution of contention or conflict between nodes, such as when a given transmitting node is connected to two different receiving nodes by the interconnection medium.

Figure 2:
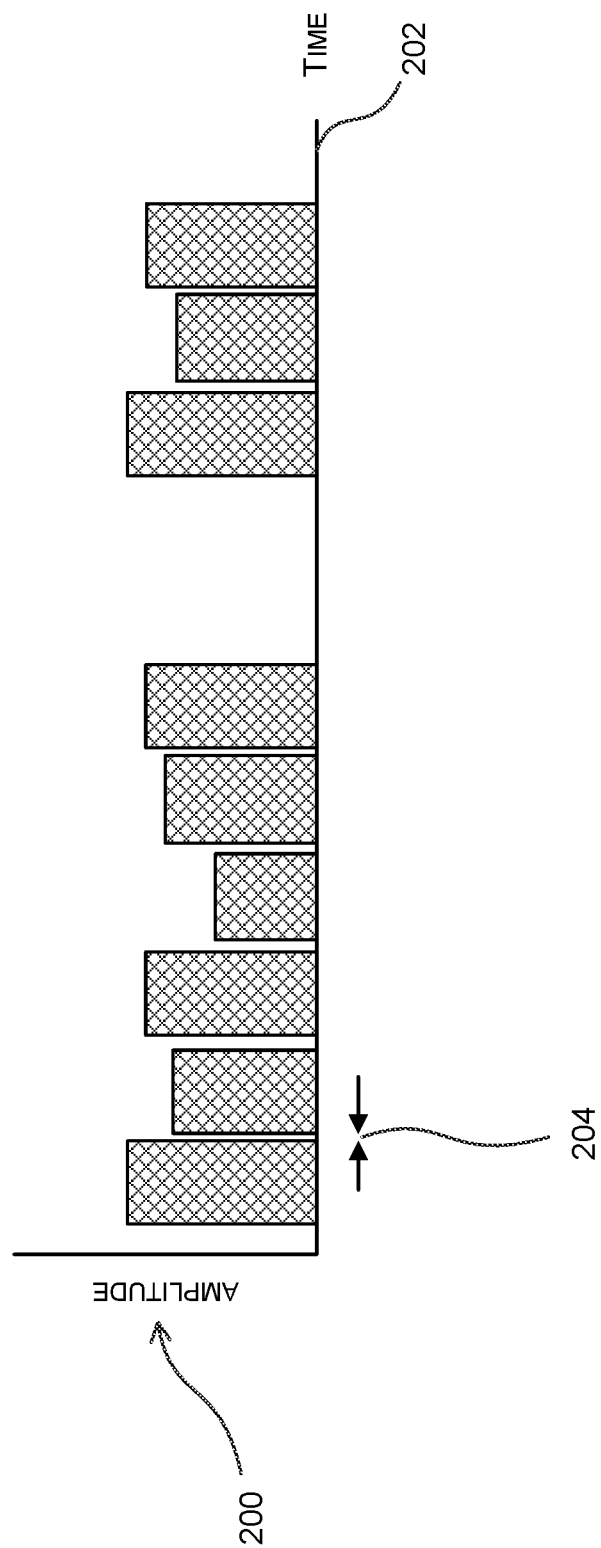
FIG. 2 is a graph of the amount of amplitude received at a receiver node over time, for a plurality of different channels.

FIG. 2 is a schematic diagram included to aid understanding of the present technology. FIG. 2 shows an amplitude 200 of an incoming signal at a receiving node from a plurality of different transmitting nodes over time. Bursts of data are sent with one burst per time slot, each burst from a different one of the transmitting nodes. The transmitting nodes operate at the same frequency (due to frequency synchronization) and the bursts of data from each transmitting node are separated by the same time interval. A guard band 204 which is a time interval with no transmission occurs between the bursts.

Each bar in the graph represents the amplitude at the receiving node from one of the bursts of data in a time slot. Since each burst is from a different transmitting node, the amplitude of the burst at the receiving node is different for each burst. Therefore the receiving node experiences rapid changes in received amplitude over time 202.

Figure 3:
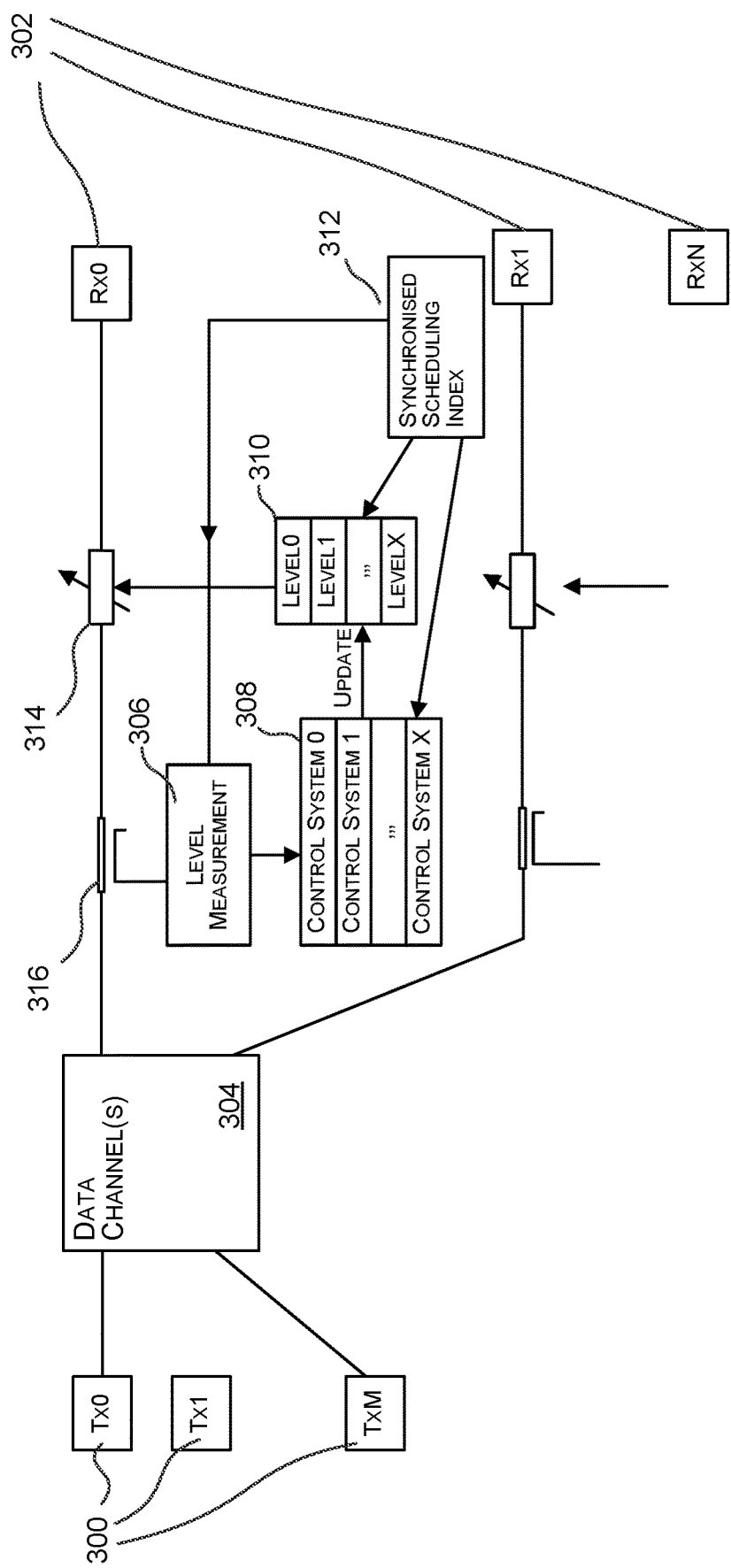
FIG. 3 is a schematic diagram of a receive-from-many communications network with receive side amplitude caching.

FIG. 3 is a schematic diagram of a receive-from-many communications network with receive side amplitude caching. The communications network comprises a plurality of transmitting nodes 300 denoted $Tx_0, Tx_1, \ldots, Tx_M$ and a plurality of receiving nodes 302 denoted Rx0, Rx1, . . . , RxN where M is the number of transmitting nodes and N is the number of receiving nodes. The transmitting nodes 300 and receiving nodes 302 are interconnected by an interconnection medium which in this figure is shown as data channels 304. Note that not all the connections between the transmitting and receiving nodes are shown in FIG. 3 for clarity.

The receive-from-many communications network has a synchronization mechanism comprising synchronized scheduled indexing circuitry 312. In some examples, synchronized scheduled indexing circuitry receives input from a reference clock which is connected to all the nodes of the communications network in a point to point manner or in a hierarchical manner.

Each receiving node 302 is connected to the interconnection medium (data channels 304) via an amplitude modifier which in this example is an amplitude attenuator 314. The amplitude attenuator 314 is connected in series between the receiving node 302 and the data channels 304. Each amplitude attenuator 314 receives input from a level selector 310 which selects one of a plurality of amplitude levels (level 0, level 1, level x) at which the amplitude attenuator operates at any one time. There is one amplitude level for each transmitting node. The level selector 310 is synchronized by the synchronization mechanism of the communications network. In the example of FIG. 3 the level selector 310 is synchronized using synchronized scheduled indexing circuitry 312. Each level selector 310 is a store of amplitude data as described above with reference to FIG. 1 since each level is a cached amplitude value to be used to correct the amplitude of the incoming signal when that incoming signal is from a particular one of the transmitting nodes.

The synchronized scheduled indexing circuitry 312 computes the current time slot and determines which transmitting node is sending to the receiving node at the current time slot. It does this by having knowledge of the possible transmitting nodes and by knowing a schedule which is used to allocate transmitting nodes to the receiving node, such as a round robin schedule or other allocation schedule. Since the level selector 310 has input from the synchronized scheduled indexing circuitry 312 it is able to control the amplitude attenuator 314 to make the appropriate amplitude correction at each time slot.

Each receiving node 302 has an associated amplitude measurement circuit comprising a level measurement component 306 and a plurality of control systems 308. The level measurement component 306 and the control systems 308 are connected to the synchronized scheduled indexing circuitry 312.

The level measurement component 306 measures amplitude of the incoming signal using amplitude sampler 316. In an example where the communications network is implemented using optical fibre, the amplitude sampler 316 is an optical tap and photodiode and the level measurement component 306 comprises an electrical envelope detector and integrate and dump circuit which integrates the amplitude of the incoming analog signal over a time slot, where the time slot is indicated by the synchronized scheduled indexing circuitry 312. In some cases the integrate and dump functionality is replaced by a filter and sampler.

The plurality of control systems 308 has one control system for each transmitting node 300. Each control system updates the memory at the level selector 310 according to the measured amplitude of the incoming signal, when the incoming signal is from the appropriate one of the transmitting nodes. Each control system seeks to keep the amplitude of the incoming signal at the receiving node generally constant. In addition each control system seeks to minimize an insertion loss; that is, to maximize the received amplitude. In some examples individual ones of the control systems target a specific received amplitude. An example control system is, but is not limited to, a second order linear feedback system having bandwidths and stability according to standard control theory. In some examples, individual ones of the control systems have one or more additional elements selected from any one or more of: filter element, delay element, phase shift element. In an example, a minimum insertion loss criteria is enforced by taking insertion loss values for each transmitting node and adding an offset so the smallest insertion loss is set to zero.

In an example, the memory indexing, that is, the operation of the level selector 310 is synchronized to a slot schedule of the receive-from-many communications network. In this case, one packet is received per time slot. Use of the synchronization allows the previous value of the cached amplitude to be used while the control system is calculating an update based on the current measurement, which will typically be available after the packet has finished being received. This also allows for values to be held if some outage is detected and reasonable performance to continue upon re-establishing of the link if the channel fading is slow relative to the outage time.

Figure 4:
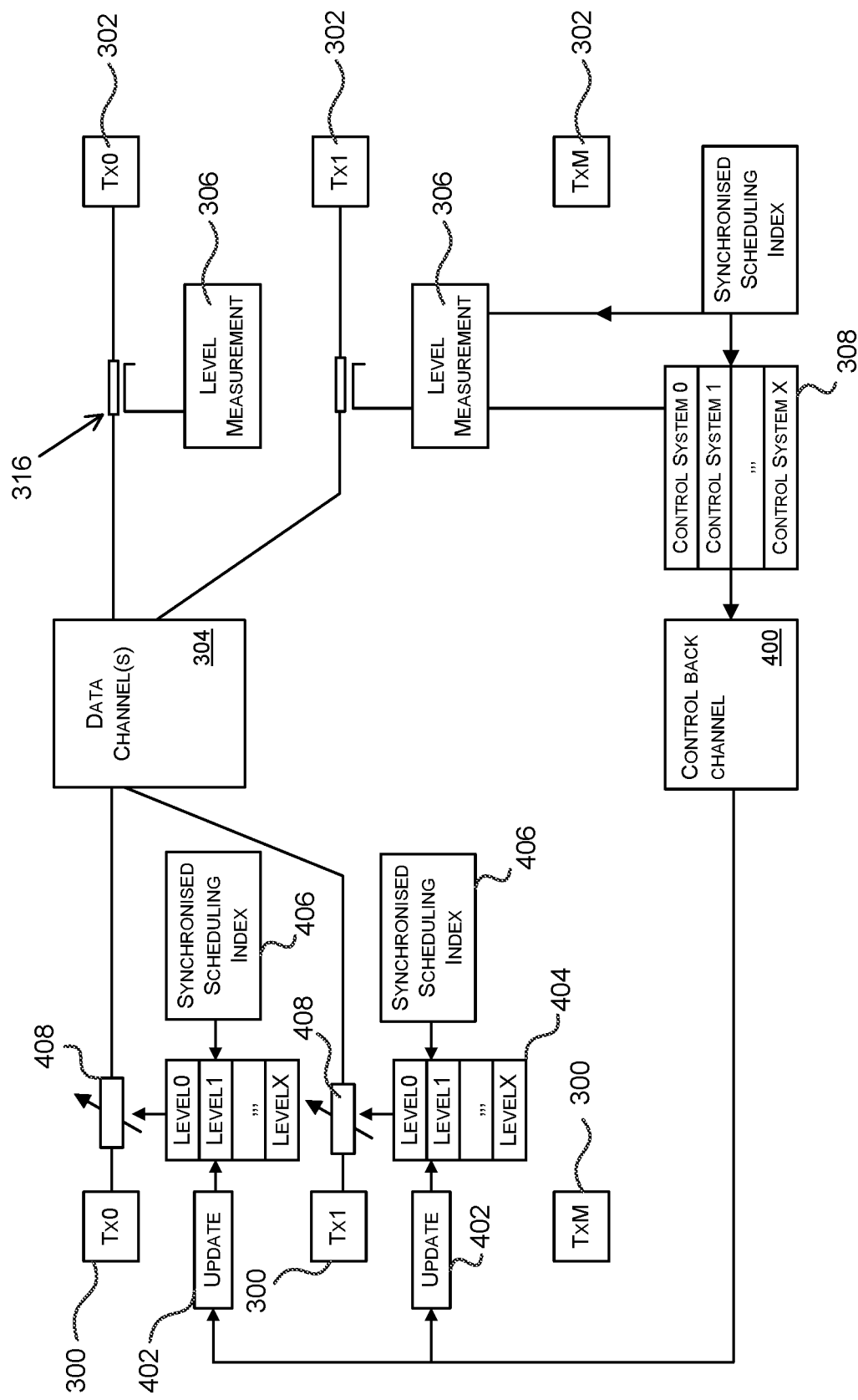
FIG. 4 is a schematic diagram of a receive-from-many communications network with transmit side amplitude caching.

FIG. 4 is a schematic diagram of a receive-from-many communications network with transmit side amplitude caching. The communications network has a plurality of transmitting nodes 300 denoted $Tx_0, Tx_1, \ldots, Tx_M$ and a plurality of receiving nodes 302 denoted Rx0, Rx1, ..., RxN where M is the number of transmitting nodes and N is the number of receiving nodes. The transmitting nodes 300 and receiving nodes 302 are interconnected by an interconnection medium which in this figure is shown as data channels 304. Note that not all the connections between the transmitting and receiving nodes are shown in FIG. 4 for clarity.

The receive-from-many communications network has a synchronization mechanism comprising synchronized scheduled indexing circuitry 406. In some examples, synchronized scheduled indexing circuitry receives input from a reference clock which is connected to all the nodes of the communications network in a point to point manner or in a hierarchical manner. In other examples, the synchronized scheduled indexing circuitry receives input from a clock signal transfer process in order to synchronize the nodes of the network.

An amplitude sampler 316 is present on the communication link between each receiver and the interconnection medium (data channels 304). Each amplitude sampler 316 operates as described above with reference to FIG. 3 to estimate the amplitude of the incoming signal at the respective receiving node 302 in a given time slot. Control systems 308 are present as described above with reference to FIG. 3. The control systems 308 are connected to the level measurement component 306 at the receiving node or local to the receiving node. The estimated amplitude is input to the appropriate control system according to the known transmitting node for the particular time slot. The control system computes an amplitude adjustment value to be stored in memory at a level selector 404. The level selector 404 is located at the transmit node. In order to send the amplitude adjustment value from the receive side to the transmit side, the amplitude adjustment value is sent over a control back channel 400 from the relevant control system to an update component 402 at the appropriate transmit node 300. In an example, the communications path between the transmit node and receive node during the particular time slot comprises a control back channel which enables the amplitude adjustment value to be sent.

When the update component 402 receives the amplitude adjustment value it updates the appropriate cached value at the level selector 404.

Each transmit node 300 is connected in series with an amplitude modifier 408 which operates to adjust an amplitude of a signal emanating from the transmit node. The amplitude modifier 408 is connected between the transmit node and the interconnection medium. The amount of amplitude modification done by the amplitude modifier 408 is controlled by the level selector 404 in the same way as for the level selector in FIG. 3. The level selector is synchronized using synchronized scheduled indexing circuitry 406 as described for FIG. 3.

Figure 5:
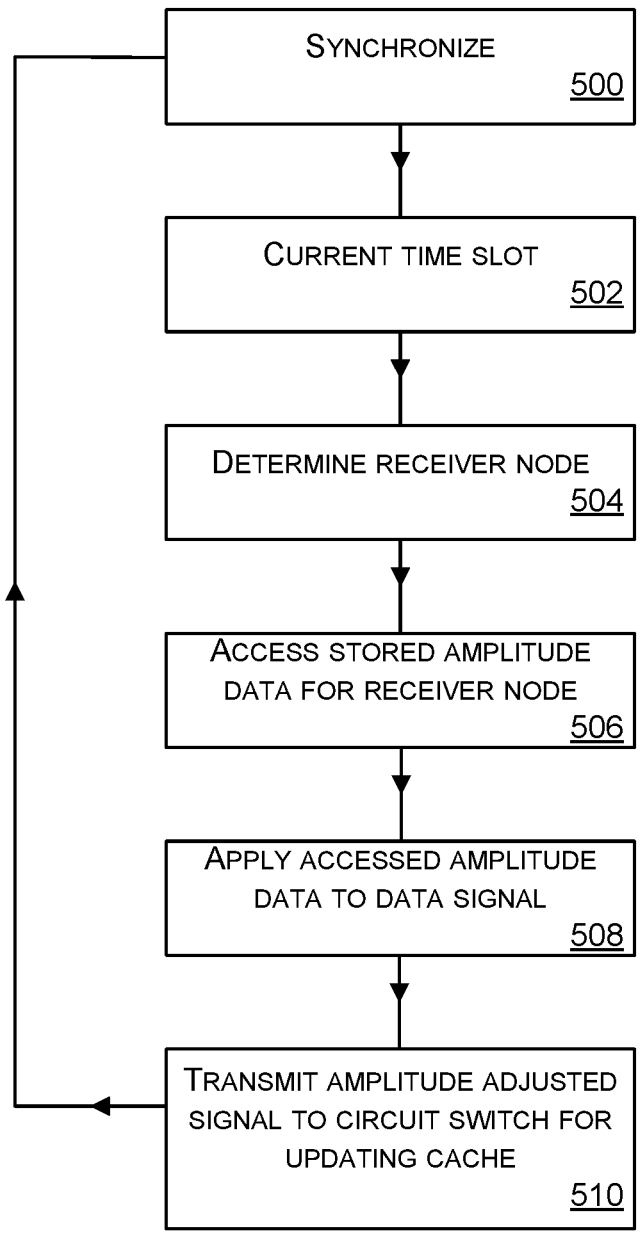
FIG. 5 is a flow diagram of a method at a transmitter of transmitting an amplitude adjusted signal.

FIG. 5 is a flow diagram of a method implemented at a transmitter at one of the nodes of the communications network of FIG. 1. In this method transmit side amplitude caching is used as in FIG. 4. The transmitter is synchronized 500 using the synchronization mechanism which is any of the synchronization mechanisms mentioned above. At the current time slot 502 where a time slot is a time interval measured in the units of a clock with frequency synchronized by the frequency synchronization mechanism, the transmitter determines 504 which receiving node it is to transmit to. This is determined using a rule or allocation scheme known to the transmitter, or in any other suitable way. In an example, a round robin allocation scheme is used and is known by each node of the communications network and the arbitration mechanism. In another example, the transmitter is informed of the identity of the receiving node by receiving this information from the arbitration mechanism.

The transmitter accesses 506 stored amplitude data for the receiving node. This is done by looking up stored amplitude data for the receiving node in a store (such as level selector 310, 404) local to the transmitter or accessible to the transmitter from a location remote of the transmitter. In a preferred example, the stored amplitude data is in a cache at the transmitter. The stored amplitude data for the receiving node is an amplitude value which expresses the amplitude offset to be applied to the signal in order to obtain generally constant signal amplitude at the receiving node. The stored amplitude data is per node stored amplitude data. The stored amplitude data is obtained empirically using amplitude measurement.

The transmitter applies 508 the accessed amplitude data to the signal in order to adjust the amplitude of the transmitted signal to take into account the amplitude offset. The amplitude of the transmitted signal is adjusted using an amplitude controller comprising electronic circuitry as described above. In some examples the amplitude controller has low latency. This is especially useful where the interconnection medium switches between the nodes with high frequency. The transmitter transmits 510 the amplitude adjusted signal to the interconnection medium and the signal is routed from there to the receiving node over the communications network. The method of FIG. 5 repeats as indicated.

Figure 6:
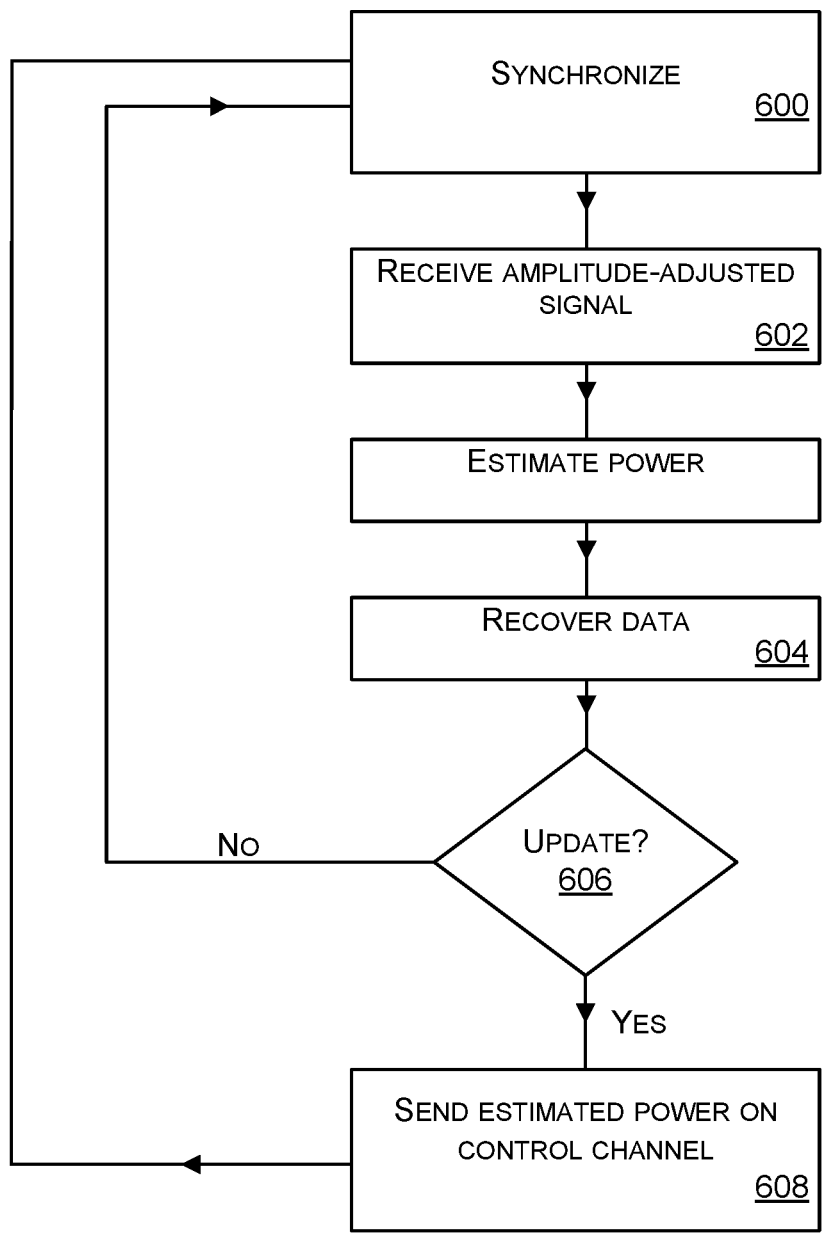
FIG. 6 is a flow diagram of a method at a receiver of receiving an amplitude adjusted signal from a transmitter.

The process at the receiving node is now described, in the case that the method of FIG. 5 is used at the transmitter. With reference to FIG. 6, the receiving node is synchronized 600 as for the transmitter using any of the synchronization processes described herein. The receiving node receives 602 an amplitude adjusted signal from the transmitter such that the amplitude of the received signal is approximately constant with respect to signals received in previous time slots. The receiving node is thus able to operate effectively and robustly to process the incoming signal to demodulate it and recover data 604 from the received signal.

The receiving node estimates 603 the amplitude of the incoming signal in the current time slot. It inputs the estimated amplitude to a control system for the particular transmitting node and the control system computes an amplitude adjustment value as described above with reference to FIG. 3. The amplitude adjustment value is sent 608 to the transmitting node on a control channel and stored in a cache at the transmitting node or local to the transmitting node. The cache is the level selector 310 in the example of FIG. 3.

Figure 7:
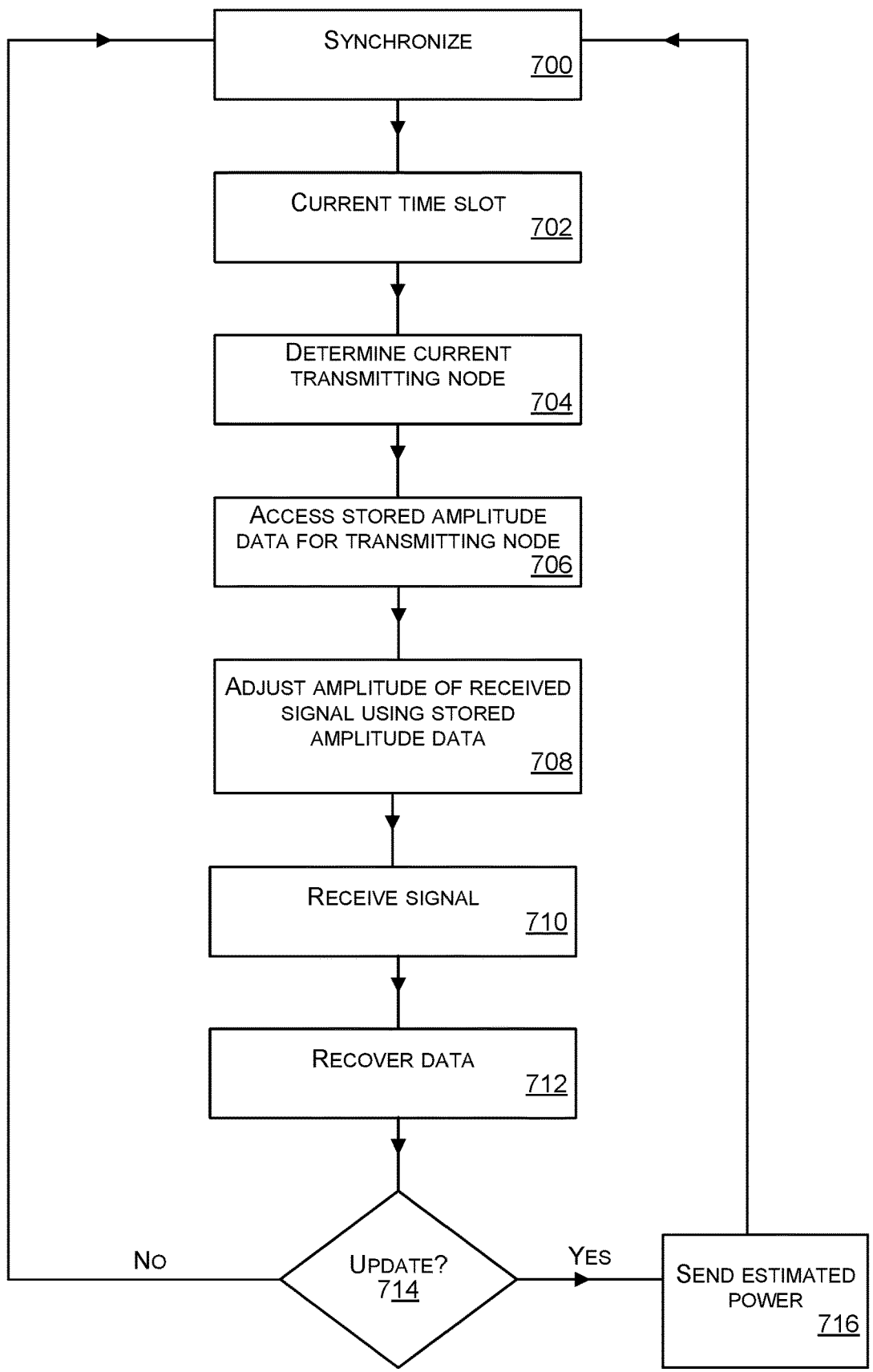
FIG. 7 is a flow diagram of a method at a receiver of adjusting amplitude of a received signal.

FIG. 7 is a flow diagram of an example method where the receiving node adjusts the sampling amplitude of the received signal, rather than the transmitter adjusting the amplitude. This method is used by a receiving node as in FIG. 3. The receiving node is synchronized 700 using any of the synchronization mechanisms described herein. This ensures that the receiving node knows the frequency of the signal it will receive.

At the current timeslot 702 the receiving node determines 704 the current transmitting node. This is determined using a rule or allocation scheme known to the receiving node, or in any other suitable way. In an example, a round robin allocation scheme is used and is known by each node of the communications network and the arbitration mechanism. In another example, the receiving node is informed of the identity of the transmitting node by receiving this information from the arbitration mechanism.

The receiving node accesses 706 stored amplitude data for the transmitting node. The stored amplitude data comprises an amplitude adjustment value to be applied by the receiving node to the incoming signal. The receiving node then receives 710 a signal from the transmitting node transmitted over the communications network, adjusts its amplitude using the amplitude adjustment value, and is able to recover data 712 from the received signal. The receiving node uses an amplitude modifier to adjust the amplitude of the incoming signal as described above with reference to FIG. 3.

The receiving node checks 714 whether an update is needed or not. It measures the amplitude of the incoming signal in the current time slot. It uses a control system to compute an amplitude adjustment value using the measured amplitude of the incoming signal in the current time slot. If the amplitude adjustment value is significantly different from the previously computed amplitude adjustment value for the same transmit node, then the receiving node triggers an update at check point 514. If an update is triggered the amplitude adjustment value for the current time slot is sent over a control channel to a cache at the transmit node, or accessible to the transmit node. The amplitude adjustment value is used to update the cache which is the level selector 310. The method then repeats as indicated in FIG. 7. If no update is to be done at check 714 the method repeats as indicated in FIG. 7.

Figure 8:
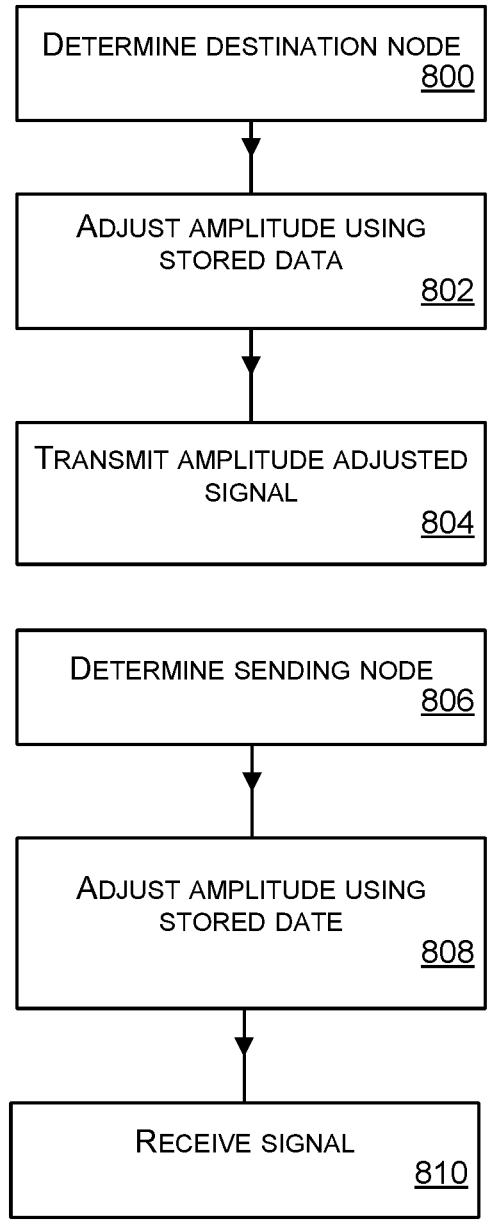
FIG. 8 is a flow diagram of a method at a transmitter of transmitting a signal to a receiver which is carrying out amplitude adjustment, and of a flow diagram of a method at the receiver of carrying out the amplitude adjustment.

The methods of FIGS. 5 to 6 are for the case where the transmitting node adjusts the amplitude of the transmitted signal using stored amplitude data and the receiving node makes no use of the stored amplitude data. The method of FIG. 7 is for the case where the receiving node adjusts the amplitude of the received signal but the transmitting node makes no use of the stored amplitude data. It is also possible to have a hybrid of these methods. That is, part of the amplitude adjustment is done at the transmitting node and part of the amplitude adjustment is done at the receiving node. The proportion of the amplitude adjustment to be done by each party is agreed in advance. An example of a hybrid method is given with reference to FIG. 8. A transmit node determines 800 which destination node is applicable for the current time slot. It adjusts 802 the amplitude of a signal which it will transmit to the destination node, using stored amplitude data. It then transmits 804 the amplitude adjusted signal to the receiving node.

The receiving node determines 806 which transmitting node is applicable for the current time slot. It adjusts 808 the amplitude of an incoming signal at the receiving node using stored amplitude data. The receiving node proceeds to receive 810 the signal and to process it by demodulation.

Each node 102 of the communications network of FIG. 1 comprises one or more processors 130, 146 which are microprocessors, controllers or any other suitable type of processors for processing computer executable instructions to control the operation of the device in order to implement the technology described herein. In some examples, for example where a system on a chip architecture is used, the processors 130, 146 include one or more fixed function blocks (also referred to as accelerators) which implement a part of the method of FIGS. 5 to 8 in hardware (rather than software or firmware).

The computer executable instructions are provided using any computer-readable media that is accessible by node 102. Computer-readable media includes, for example, computer storage media such as memory 134, 150 and communications media. Computer storage media, such as memory 134, 150, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 134, 150) is shown within the node 102, 120, 140 it will be appreciated that the storage is, in some examples, distributed or located remotely and accessed via a network or other communication link (e.g. using interconnection medium 112).

Alternatively or in addition to the other examples described herein, examples include any combination of the following:

Clause A. A communications network comprising:
a plurality of nodes connected via an interconnection medium to form a receive-from-many communications network;
a synchronisation mechanism which synchronizes a signal frequency of the nodes;
at least one store holding signal amplitude data of signals previously sent between specified pairs of nodes of the communications network;
an amplitude controller which uses the stored data to adjust amplitudes of signals communicated between at least one of the pairs of nodes of the communications network. By adjusting the amplitudes using the stored amplitude data it is possible to smooth the received amplitude signal and reduce changes in the received amplitude signal and hence performance at the receiver is improved.

Clause B The communications network of clause A wherein the stored signal amplitude data comprises, for each pair of nodes, an amplitude correction value to be applied to a signal before transmission or an amplitude correction value to be applied to the signal after reception. Correction of the amplitude signal before transmission gives improved smoothing of the received amplitude signal and improved performance at the receiver.

Clause C The communications network of any preceding clause wherein the stored signal amplitude data comprises, for each pair of nodes, an amplitude correction value to be applied to a signal after reception and an amplitude correction value to be applied to a signal before transmission. Using a hybrid approach gives robustness.

Clause D The communications network of any preceding clause wherein the stored signal amplitude data is determined by estimating the amplitude of signals received at receiver nodes of the pairs of nodes. In this way accuracy of the stored signal amplitude data is ensured.

Clause E The communications network of clause D wherein the amplitude is estimated during a single time slot of a time slotting mechanism of the interconnection medium. Estimating the amplitude in a single time slot is a fast and efficient way of obtaining the amplitude data for the store.

Clause F The communications network of clause D wherein the stored signal amplitude data is dynamically updated using the estimated amplitude. Using a dynamic update gives ability to have a continually up to date store of amplitude data and this improves accuracy and performance.

Clause G The communications network of clause D wherein the estimated amplitude is sent over a control channel of the communications network to the store. Using the control channel provides a fast and effective way to transfer the data.

Clause H The communications network of any preceding clause wherein the frequency synchronization mechanism comprises one or more of:
 a reference clock connected to the plurality of nodes in a point to point manner or in a hierarchical manner;
 a clock signal transfer process.

Clause I The communications network of any preceding clause wherein the interconnection medium is configured to switch between different pairs of the nodes in a time slotted manner, such that at each time slot the interconnection medium switches at least one node of a pair off the other node of the pair and onto a different node.

Clause J A communications network node comprising:
 a transmitter or a receiver configured to communicate with a plurality of other transmitting nodes via an interconnection medium interconnecting the node and the other nodes;
 the node being frequency synchronized with regard to signal transmission and reception, via a frequency synchronization mechanism with a plurality of the other nodes;
 at least one store holding amplitude data of signals previously sent between the node and a plurality of the other nodes;
 an amplitude controller configured to use the stored data to adjust amplitude of signals sent or received by the node.

Clause K The communications network node of clause J wherein the stored amplitude data comprises amplitude offsets to be applied to a signal before transmission, and/or to a received signal.

Clause L The communications network node of clause J wherein the transmitter is configured to receive amplitude estimates over a control channel and to update the amplitude data using the received amplitude estimates.

Clause M The communications network node of clause J or clause K or clause L wherein the receiver is configured to estimate an amplitude of a signal received at the receiver.

Clause N The communications network node of clause M wherein the receiver is configured to estimate the amplitude in a single time slot of the interconnection medium.

Clause O The communications network node of any of clauses J to N wherein the transmitter or the receiver is switched, in a time slotted manner, between different other nodes of the communications network.

Clause P A method in a receive-from-many communications network comprising a plurality of nodes connected to one another via an interconnection medium, the method comprising:
 operating a frequency synchronizing mechanism to synchronize a signal frequency of the nodes;
 storing amplitude data relating to amplitude of signals previously received at individual ones of the nodes from specified other ones of the nodes;
 using the stored data to adjust amplitude of signals communicated between pairs of the nodes.

Clause Q The method of clause P comprising estimating the amplitude of signals received at receiver nodes of the pairs of nodes and updating the stored amplitude data using the estimated amplitude.

Clause R The method of clause Q comprising estimating the amplitude during a single time slot of a time slotting mechanism of the interconnection medium.

Clause S The method of clause R comprising sending the estimated amplitude over a control channel of the communications network to a store holding the stored amplitude data.

Clause T The method of any of clauses P to S comprising using the interconnection medium to switch between pairs of the nodes in a time slotted manner.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A communications network comprising:
a plurality of nodes connected via an interconnection medium to form a receive-from-many communications network;
a synchronisation mechanism which synchronizes a signal frequency of the nodes;
at least one store holding signal amplitude data of signals previously sent between specified pairs of nodes of the plurality of nodes of the communications network; and
an amplitude controller which uses the stored data to adjust amplitudes of signals communicated between at least one of the pairs of nodes of the communications network.

2. The communications network of claim 1 wherein the stored signal amplitude data comprises, for each pair of nodes, an amplitude correction value to be applied to a signal before transmission or an amplitude correction value to be applied to the signal after reception.

3. The communications network of claim 1 wherein the stored signal amplitude data comprises, for each pair of nodes, an amplitude correction value to be applied to a signal after reception and an amplitude correction value to be applied to a signal before transmission.

4. The communications network of claim 1 wherein the stored signal amplitude data is determined by estimating the amplitude of signals received at receiver nodes of the pairs of nodes.

5. The communications network of claim 4 wherein the amplitude is estimated during a single time slot of a time slotting mechanism of the interconnection medium.

6. The communications network of claim 4 wherein the stored signal amplitude data is dynamically updated using the estimated amplitude.

7. The communications network of claim 4 wherein the estimated amplitude is sent over a control channel of the communications network to the store.

8. The communications network of claim 1 wherein the frequency synchronization mechanism comprises one or more of:
a reference clock connected to the plurality of nodes in a point to point manner or in a hierarchical manner;
a clock signal transfer process.

9. The communications network of claim 1 wherein the interconnection medium is configured to switch between different pairs of the nodes in a time slotted manner, such that at each time slot the interconnection medium switches at least one node of a pair off the other node of the pair and onto a different node.

10. A communications network node comprising:
a transmitter or a receiver configured to communicate with a plurality of transmitting nodes via an interconnection medium interconnecting the communications network node and the plurality of transmitting nodes;
the communications network node being frequency synchronized with regard to signal transmission and reception, via a frequency synchronization mechanism with the plurality of transmitting nodes;
at least one store holding amplitude data of signals previously sent between the communications network node and a plurality of the plurality of transmitting nodes; and
an amplitude controller configured to use the stored data to adjust amplitude of signals sent or received by the communications network node.

11. The communications network node of claim 10 wherein the stored amplitude data comprises amplitude offsets to be applied to a signal before transmission, and/or to a received signal.

12. The communications network node of claim 10 wherein the transmitter is configured to receive amplitude estimates over a control channel and to update the amplitude data using the received amplitude estimates.

13. The communications network node of claim 10 wherein the receiver is configured to estimate an amplitude of a signal received at the receiver.

14. The communications network node of claim 13 wherein the receiver is configured to estimate the amplitude in a single time slot of the interconnection medium.

15. The communications network node of claim 10 wherein the transmitter or the receiver is switched, in a time slotted manner, between nodes other than the plurality of transmitting nodes of the communications network.

16. A method in a receive-from-many communications network comprising a plurality of nodes connected to one another via an interconnection medium, the method comprising:
operating a frequency synchronizing mechanism to synchronize a signal frequency of the plurality of nodes;

storing amplitude data relating to amplitude of signals previously received at individual ones of the plurality of nodes from specified other ones of the plurality of nodes; and using the stored data to adjust amplitude of signals communicated between pairs of the plurality of nodes.

17. The method of claim 16 comprising estimating the amplitude of signals received at receiver nodes of the pairs of nodes and updating the stored amplitude data using the estimated amplitude.

18. The method of claim 17 comprising estimating the amplitude during a single time slot of a time slotting mechanism of the interconnection medium.

19. The method of claim 18 comprising sending the estimated amplitude over a control channel of the communications network to a store holding the stored amplitude data.

20. The method of claim 16 comprising using the interconnection medium to switch between pairs of the plurality of nodes in a time slotted manner.

* * * * *